United States Patent [19]

Kondo et al.

[11] Patent Number: 5,004,641

[45] Date of Patent: Apr. 2, 1991

[54] ELECTROCONDUCTING SEMICONDUCTOR AND BINDER OR BINDER PRECURSOR COATED IN A SUBBING LAYER

[75] Inventors: Syunichi Kondo; Syu Watarai, both of Kanagawa, Japan

[73] Assignee: Fuji Photo Film Co., Ltd., Kanagawa, Japan

[21] Appl. No.: 335,357

[22] Filed: Apr. 10, 1989

[30] Foreign Application Priority Data

Apr. 11, 1988 [JP] Japan ................................ 63-88377
Apr. 11, 1988 [JP] Japan ................................ 63-88378

[51] Int. Cl.[5] ........................ B32B 27/40; B32B 27/38

[52] U.S. Cl. .................................... 428/208; 428/901; 428/424.6; 428/413; 428/148; 428/215; 428/219; 428/337; 428/339; 428/328; 428/341; 428/416; 428/425.9; 428/423.1; 428/483; 428/518; 428/689

[58] Field of Search ..................... 428/901, 208, 424.6, 428/413, 148, 215, 219, 337, 334, 378, 341, 416, 425.9, 423.1, 483, 518, 689

[56] References Cited

U.S. PATENT DOCUMENTS

| | | | |
|---|---|---|---|
| 3,143,421 | 3/1960 | Nadeau et al. | 430/535 |
| 3,597,272 | 8/1971 | Gramza et al. | 428/696 X |
| 3,681,127 | 8/1972 | Fowler et al. | 428/483 |
| 3,950,594 | 4/1976 | Hohlfeld et al. | 428/511.1 |
| 4,294,739 | 10/1981 | Upson et al. | 428/520 X |
| 4,456,658 | 6/1984 | Kubitza et al. | 428/424.6 |
| 4,592,961 | 6/1986 | Ehrreich | 428/480 |
| 4,599,268 | 7/1986 | Chellis | 428/413 X |
| 4,666,758 | 5/1987 | Hunter et al. | 428/212 |
| 4,748,084 | 5/1988 | Hata et al. | 428/413 X |
| 4,759,970 | 7/1988 | Seeger et al. | 428/901 X |
| 4,812,356 | 3/1989 | Meyer et al. | 428/424.6 X |

OTHER PUBLICATIONS

Derwent Abstract No. 77-36987y.

*Primary Examiner*—Ellis P. Robinson
*Assistant Examiner*—William P. Watkins, III
*Attorney, Agent, or Firm*—Sughrue, Mion, Zinn, Macpeak & Seas

[57] ABSTRACT

An electroconductive element comprising a support, a subbing layer, and an electroconductive layer, wherein the electroconductive layer is formed by coating, on the subbing layer, a solution comprising:

(A) a compound semiconductor, (B) a solvent dissolving the compound semiconductor, and (C) a resin or a resin precursor soluble in the solvent.

20 Claims, No Drawings

ELECTROCONDUCTING SEMICONDUCTOR AND BINDER OR BINDER PRECURSOR COATED IN A SUBBING LAYER

FIELD OF THE INVENTION

This invention relates to an electroconductive element, and more particularly to an electroconductive element having high electroconductivity capable of being used as elements for various products over a wide field.

BACKGROUND OF THE INVENTION

In the recent progress of electronics, the impartation of electric conductivity to the surface of plastics has become a particularly important theme. With such plastics advancements have occurred in, e.g., static prevention for preventing the occurrence of various problems caused by static electricity, for example, the occurrence of the attachment of dust, etc., electric discharging caused by electrostatic charging, and electromagnetic wave obstruction of casings and parts of electronic instruments.

Transparent electroconductive films have been widely used, e.g., as base materials for electrophotographic recording, base materials for electrostatic photographic recording, transparent electrodes for thin film type liquid crystal displays, transparent electrodes for dispersion type electroluminescence, transparent electrodes for touch panels, antistatic films for clean rooms, windows of electric meters, video tape recorders, etc., transparent heaters, etc. The development of transparent electroconductive films which are inexpensive and have high performance has been strongly desired.

Conventional transparent electroconductive films include the semiconductor type thin films, such as indium tin oxide films (ITO films) doped with tin, tin oxide films doped with antimony, cadmium tin oxide films (CTO films), copper iodide films, titanium oxide films, and zirconium oxide films. Among these films, the ITO films are most excellent in terms of both transparency and electric conductivity. Tin oxide films require a high base plate temperature for forming films and hence it is difficult to apply such a film to a polymer film. CTO films have a smaller energy gap (the absorption end is at a longer wavelength side) than the ITO films. Thus, when the film thickness is increased, the film become yellowish to some extent. Also, copper iodide films, titanium oxide films, and zirconium oxide films are inferior in both transparency and electric conductivity to the aforesaid semiconductor films.

The above semiconductor thin electroconductive films are formed by, e.g., vapor deposition which requires large production equipment for forming the films, which increases the production cost.

As a method of forming the above semiconductor thin films at a low cost, a method of previously applying a subbing layer to a polymer film and letting a compound semiconductor absorb in the surface of the subbing layer is known. According to this method, the subbing layer can improve the adhesion of the support for a layer further formed thereon as described in JP-B-48-9984 (corresponding to U.S. Pat. No. 3,597,272) (the term "JP-B" as used herein refers to an "examined Japanese patent publication").

Hitherto, for a coating type electroconductive film using a compound semiconductor is formed by a method of forming a subbing layer on a support using a resin having adhesivity to the support and coating thereon a solution of a compound semiconductor to form fine particles of the compound semiconductor near the surface of the subbing layer at a high concentration.

However, although the electroconductive film of semiconductor formed by the aforesaid method is, in the beginning, excellent in terms of adhesion to the support, the transparency, and the electric conductivity, there are disadvantages in that the fine particles of the compound semiconductor become aggregated over the passage of time so as to form large crystals. This causes white turbidity and reduces the transparency. Further, the electric conductivity is greatly reduced at the white turbid portions.

When a commercially available vinylidene chloride resin or vinyl chloride resin coating material is used as the binder for the subbing layer, the components formed by the photodecomposition, etc., reduce the electric conductivity of the compound semiconductor such that is not useful for practical purposes in a field requiring light fastness.

In the wide application field of a transparent electroconductive films, it is as a matter of course required that the electric conductivity be stable for a long period of time. Depending on the usage, it is also important that the film has a resistance to organic solvent solubility.

For example, in the case of applying the transparent electroconductive film to an electrophotographic recording material, the electroconductive film is used in a form of a multilayer structure formed by coating a barrier layer, a layer of a photoconductive composition, a protective layer, etc., on an electroconductive film.

In the case of forming these multilayer coating structures, it frequently happens that the coating solvent causes fine cracks or creases in or on the subbing layer and the electroconductive layer, which gives serious problems for practical use. Hence, it has been desired to solve these problems.

Furthermore, the adhesion of such a coating layer and the electroconductive layer of a compound semiconductor is frequently insufficient. Hence, improvement of the adhesion has also been desired.

SUMMARY OF THE INVENTION

An object of this invention is, therefore, to provide an electroconductive element having high stability, having excellent electric conductivity, transparency, light resistance, and storage stability for a long period of time, as well as having organic solvent resistance and high adhesion for an upper layer, in the case of a multilayer structure form.

The above-described object has been met by an electroconductive element comprising a support, a subbing layer, and an electroconductive layer, wherein said electroconductive layer is formed by coating, on a subbing layer, a solution comprising:

(A) a compound semiconductor, (B) a solvent capable of solving the compound semiconductor, and (C) a resin or a resin precursor soluble in the solvent.

DETAILED DESCRIPTION OF THE INVENTION

The electroconductive layer of this invention is preferably formed by coating the aforesaid solution containing an epoxy resin as the resin or a resin precursor soluble in the aforesaid solvent.

Also, the electroconductive layer of this invention is preferably formed by coating the aforesaid solution containing an isocyanate compound as the resin or the resin precursor soluble in the aforesaid solvent.

Still further, the electroconductive layer of this invention is preferably formed by coating a solution containing a compound semiconductor, an isocyanate resin, and an active hydrogen compound on the subbing layer.

Moreover, according to a preferred embodiment of this invention, there is provided an electroconductive element comprising a support, a subbing layer, and an electroconductive layer, wherein the subbing layer, comprising a vinylidene chloride series compound represented by the following formula (I), is formed on the support and the electroconductive layer formed thereon comprises a compound semiconductor:

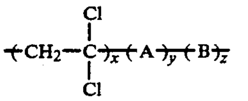 (I)

wherein A represents at least one structure unit selected from the group consisting of

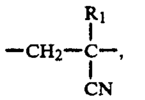, 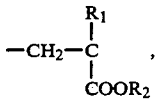,

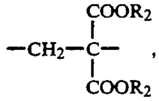, and 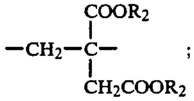;

B represents at least one structure unit selected from the group consisting of

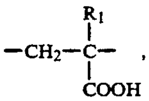, 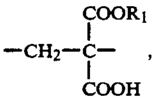, and 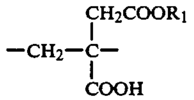

wherein $R_1$ represents a hydrogen atom, a methyl group, an ethyl group, or a propyl group and $R_2$ represents a methyl group, an ethyl group, or a propyl group; x is in the range of from 65 to 90 mol %, y is in the range of from 0 to 35 mol %, z is in the range of from 0 to 35 mol %, and $x+y+z=100$.

In the electroconductive element of this invention having the electroconductive layer formed by coating the aforesaid solution, the crystallization of the compound semiconductor is greatly restrained and the aforesaid problems in conventional techniques are wholly solved.

Also, when a solution containing an isocyanate compound is used for forming the electroconductive layer of a compound semiconductor, a crosslinking reaction by the isocyanate compound proceeds sufficiently, whereby the influence of an organic solvent for coating, in the case of forming additional layer(s) on the electroconductive layer by coating, can be further reduced.

Still further, the electroconductive element having the subbing layer containing the aforesaid vinylidene series resin has a high electric conductivity and the aforesaid problems are more effectively solved.

As the support material for use in this invention there are polyesters (e.g., polyethylene terephthalate), polyolefins (e.g., polyethylene, polypropylene), cellulose esters (e.g., cellulose acetate), polymethyl methacrylates, polyamides (e.g., nylon-6), polyamides, polycarbonates, polyvinyl alcohols, vinyl chloride-vinyl acetate copolymers, glasses, papers coated by the aforesaid polyolefin or polyester, etc.

In this invention, a subbing layer is formed on such a support and in this case, as a resin for the subbing layer, a resin which is properly swelled by a solvent capable of dissolving a compound semiconductor is preferred and in a particularly preferred resin, the swelling degree $T_1/T_0$ (wherein $T_0$ is the thickness of the film of the resin before immersing it in a solvent for dissolving a compound semiconductor and $T_1$ is the thickness thereof after immersing it in the solvent for 5 minutes) is in the range of preferably from 1.05 to 2.5, and more preferably from 1.05 to 1.7 when $T_0$ is about 10 μm.

When such a resin is used for the subbing layer of the electroconductive element, the permeation of the solution of a compound semiconductor dissolved in a solvent into the subbing layer is properly controlled. This results in densely forming the fine particles of the compound semiconductor in the portion of the subbing layer near the surface of the subbing layer to provide an electroconductive layer having a high electric conductivity.

If the swelling degree of a resin for the subbing layer is less than 1.05, the fine particles of the compound semiconductor are formed on the subbing layer, whereby the electroconductive layer formed is poor in scratch resistance and also the compound semiconductor forms large crystals thereof with the passage of time which causes white turbidity. On the other hand, if the swelling degree is more than 2.5, the fine particles of the compound semiconductor are dispersed in the whole subbing layer, which results in the reduction of the electric conductivity.

As the effective resins for the subbing layer, there are polyester, polyvinyl acetal, vinyl chloride resins, vinylidene chloride resins, resins forming multidimensional netting structure, etc., although the resins for use in this invention are not limited to them.

In the aforesaid resins, vinylidene chloride resins are particularly effective in this invention. Examples of the vinylidene chloride copolymer resins are a vinylidene chloride/methyl acrylate copolymer, a vinylidene chloride/methyl methacrylate copolymer, a vinylidene chloride/acrylic acid copolymer, a vinylidene chloride/acrylonitrile copolymer, a vinylidene chloride/itaconic acid copolymer, a vinylidene chloride/methyl acrylate/acrylic acid copolymer, a vinylidene chloride/methyl methacrylate/itaconic acid copolymer, a vinylidene chloride/acrylonitrile/acrylic acid copolymer, a vinylidene chloride/acrylonitrile/itaconic acid copolymer, a vinylidene chloride/methyl acrylate/-methyl methacrylate/acrylic acid copolymer, and a vinylidene chloride/acrylonitrile/itaconic acid/acrylic acid copolymer.

In these vinylidene chloride copolymer resins, particularly effective resins are the vinylidene chloride resins shown by formula (I) described above.

The content of the vinylidene chloride component in the vinylidene chloride series resin gives large influences on the electric conductivity and the light fastness of the electroconductive element. If the content thereof is at least 65 mol %, the swelling degree of the resin for the solution of compound semiconductor is in the range of from 1.05 to 2.5 and it is possible to form a high electroconductive layer having a surface resistance of not more than $10^5$ Ω/□. On the other hand, if the content of the vinylidene chloride content is less than 65 mol %, the swelling degree of the resin becomes more than 2.5 and thus a low electroconductive layer is formed.

Also, if the content of the vinylidene chloride component is over 90 mol %, the light fastness of the resin is greatly reduced as in the case of commercially available vinylidene chloride resins for coating material, such as Saran R202 and Saran F-216 (trade name, made by Asahi Chemical Industry Co., Ltd.). Accordingly, such vinylidene chloride resins are not useful in a field requiring light fastness. The light fastness of the electroconductive element is increased with the reduction of the content of the vinylidene chloride component to a proper content.

Thus, the content of the vinylidene chloride component in the vinylidene chloride series resin for use in this invention is from 65 to 90 mol %, and particularly preferably from 70 to 85 mol %.

In formula (I) described above, A is a structure unit derived from acrylonitrile, α-alkylacrylonitrile, alkyl acrylate, alkyl α-alkylacrylate, dialkyl maleate, or dialkyl itaconate. A may be a single unit or plural units. With the increase of the proportion of the A component, the light fastness of the electroconductive element of this invention is improved and when A is acrylonitrile, the light fastness is particularly improved although the reason has not yet been clarified. The content of A in the aforesaid vinylidene chloride series resin is from 0 to 35 mol %, and particularly preferably from 10 to 30 mol %.

In formula (I), B is a structure unit derived from acrylic acid, α-alkylacrylic acid, maleic acid, monoalkyl maleate, itaconic acid, or monoalkyl itaconate. B may be a single unit or plural units. The existence of the B component improves the adhesive property with the support. The content of B in the aforesaid vinylidene chloride resin is from 0 to 35 mol %, and particularly preferably from 1 to 25 mol %.

Since the vinylidene chloride series resin shown by the aforesaid formula (I) has the excellent properties as described above, not only the electroconductive element of this invention using the resin for the subbing layer has a high electric conductivity, but also an electroconductive layer having good light fastness and an excellent adhesive property for the support is formed.

Specific examples of the vinylidene chloride series resin shown by formula (I) are a vinylidene chloride/-methyl acrylate copolymer, a vinylidene chloride/-methyl methacrylate copolymer, a vinylidene chloride/acrylonitrile copolymer, a vinylidene chloride/-diethyl maleate copolymer, a vinylidene chloride/-diethyl itaconate copolymer, a vinylidene chloride/-methyl acrylate/acrylic acid copolymer, a vinylidene chloride/methyl methacrylate/acrylic acid copolymer, a vinylidene chloride/acrylonitrile/acrylic acid copolymer, a vinylidene chloride/methyl acrylate/maleic acid copolymer, a vinylidene chloride/methyl methacrylate/maleic acid copolymer, a vinylidene chloride/acrylonitrile/maleic acid copolymer, a vinylidene chloride/methyl acrylate/itaconic acid copolymer, a vinylidene chloride/methyl methacrylate/itaconic acid copolymer, a vinylidene chloride/acrylonitrile/itaconic acid copolymer, a vinylidene chloride/methyl acrylate/methyl methacrylate/acrylic acid copolymer, a vinylidene chloride/methyl acrylate/methyl methacrylate/itaconic acid copolymer, and a vinylidene chloride/methyl methacrylate/acrylonitrile/acrylic acid copolymer.

Furthermore, a resin forming a netting structure can be also advantageously used for the subbing layer in this invention. The netting structure is a structure formed by forming chemical bonds between some specific atoms in a linear polymer. Since a resin having the netting structure is generally insoluble in solvent, it is preferred to form such a netting structure after coating the resin.

For forming the netting structure, there are practically a method using a crosslinking agent, a method using light crosslinkage, e.g., using a photopolymer, and a method of adding a polymerizable compound and then performing crosslinkage by polymerization. In these cases, crosslinking can be performed by the action of heat, visible light, radiations, ultraviolet rays, electron rays, etc.

For example, there are a method of crosslinking natural or synthetic rubber, unsaturated polyester, or a resin having an unsaturated bond such as an alkyd resin, by oxidation or by a polymerization initiator, light, heat, etc., in the presence of an unsaturated monomer, a method of crosslinking an epoxy group-containing resin, such as an epoxy resin or an epoxy group-containing acryl resin by polyamine, polyamide, polycarboxylic anhydride, etc., a method of crosslinking a resin having a hydroxy group, a carboxy group, or an amino group by the reaction with several kinds of polyisocyanate, a method of selfcrosslinking polyisocyanate by the reaction thereof with water in air, and a method of crosslinking a polyamine by the reaction with an organic acid or an acid anhydride. However, the invention is not limited to these methods.

As the compound for forming the netting structure, various kinds of compounds can be used. For example, the compounds described in *Kakvoza* (*Crosslinking Agent*) *Handbook*, published by Taisei Sha, 1981.

In this invention, the aforesaid various kinds of crosslinking methods can be used and in this case, a crosslinking agent having an isocyanate group as the crosslinking component can be advantageously used.

As the crosslinking agent having an isocyanate group, there are polyisocyanate type crosslinking agents, such as triphenylmethane triisocyanate, diphenylmethane diisocyanate, tolylene diisocyanate, a dimer of 2,4-tolylene diisocyanate, naphthalene-1,5-diisocyanate, o-tolylene diisocyanate, polymethylene polyphenyl isocyanate, hexamethylene diisocyanate, etc., and polyisocyanate adduct, such as the adduct of tolylene diisocyanate and trimethylolpropane, the adduct of hexamethylene diisocyanate and water, the adduct of xylylene diisocyanate and trimethylolpropane, etc.

These crosslinking agents can be used singly as a humidity hardening type crosslinking agent or further can be used as a mixture (two liquid mixing type) with another compound having a reactive group, such as a hydroxy group, a carboxy group, or an amino group.

Examples of such a compound having a reactive group are 1,4-butanediol, ethylene glycol, polyether type polyol, polyester type polyol, acryl type polyol, epoxy resin type polyol, 4,4-methylenebis(2-chloroaniline), and hydroxypropylated ethylenediamine.

In addition to the aforesaid humidity hardening type isocyanates and two liquid mixing type isocyanate compounds, block type isocyanates blocked by phenols, such as phenol and cresol or alcohols, can be used in this invention.

In this invention, the subbing layer may, if necessary, further contain another resin having a compatibility with the aforesaid resin for the subbing layer.

Examples of such an additional resin are a styrene-butadiene copolymer, a styrene resin, an alkyd resin, a vinyl chloride resin, a vinyl chloride-vinyl acetate resin, a polyvinylidene chloride resin, a vinyl acetate resin, polyvinyl acetal, a polyacrylic acid ester, a polymethacrylic acid ester, an isobutyrene polymer, a polyester, a ketone resin, a polyamide resin, a polycarbonate, a polythiocarbonate, copolymers of vinylhaloallylates, etc., although the invention is not limited to these resins.

There is no particular restriction on the thickness of the subbing layer but good results are obtained at a thickness of from 0.01 to 100 μm, and preferably from 0.05 to 10 μm.

The compound semiconductor which is used for the electroconductive layer of the electroconductive element of this invention are preferably cuprous iodide and silver iodide but other metal-containing compound semiconductors such as other cuprous halides than the aforesaid cuprous halide, other silver halides than the aforesaid silver halide, halides of bismuth, gold, indium, iridium, lead, nickel, palladium, rhenium, tin, tellurium, or tungsten, cuprous thiocyanate, cupric thiocyanate, silver thiocyanate, mercury iodide, etc., can be also used as the compound semiconductor.

Metal-containing compound semiconductors are not easily soluble in water and many volatile solvents, such as organic solvents. Thus, a compound forming a soluble complex salt with the compound semiconductor can be used as a solubilizing agent for the compound semiconductor.

As such a solubilizing agent, an alkali metal halide or an ammonium halide can be used as an agent for forming complex salts with some semiconductor metal halides, such as silver halide, cuprous halide, stannous halide, lead halide, etc., and in the case of using such an agent, a complex compound easily soluble in a ketone solvent is formed.

In the case of using the aforesaid solubilizing agent for the subbing layer, it is preferred to remove the solubilizing agent, by washing with, for example, water, from the layer of the compound semiconductor fine particles formed in the subbing layer by coating and drying but, in some cases, the complex salt itself gives a sufficient electric conductivity. In the latter case, the complex compound itself formed is a compound semiconductor.

Examples of the aforesaid volatile ketone solvent suitable for dissolving these complex compounds are acetone, methyl ethyl ketone, 2-pentanone, 3-pentanone, 2-hexane, 2-heptanone, 4-heptanone, methyl isopropyl ketone, ethyl isopropyl ketone, diisopropyl ketone, methyl isobutyl ketone, methyl-t-butyl ketone, diacetyl, acetylacetone, acetonylacetone, diacetone alcohol, mesityl oxide, chloroacetone, cyclopentanone, cyclohexanone, and acetophenone.

These solvents may be used singly or as a mixture thereof.

When lithium iodide or sodium iodide is used as a complex-forming agent, other solvents than the ketone solvent may be used for solving the iodide complex compound formed. Examples of the solvent for solving the iodide complex compounds are methyl acetate, ethyl acetate, n-propyl acetate, isoamyl acetate, isopropyl acetate, n-butyl acetate, tetrahydrofuran, dimethylformamide, methyl cellosolve, methyl cellosolve acetate, and ethyl acetate.

In the case of using cuprous iodide as the compound semiconductor, acetonitrile can be used as a solvent for cuprous iodide since acetonitrile forms a complex salt with cuprous iodide.

It is preferred that a compound semiconductor is used as a solution thereof at a concentration of from 0.1 to 50% by weight. Also, it is preferred that the solution is coated at a dry weight of from 40 to 2,000 $mg/m^2$, and particularly from 100 to 1,000 $mg/m^2$.

As a resin which is used together with the compound semiconductor for forming the electroconductive layer in this invention, any resins having a film-forming ability by itself and capable of being dissolved in the solvent dissolving the compound semiconductor can be used.

Examples of such a resin are a vinyl acetate resin, a vinyl chloride-vinyl acetate resin, a vinyl acetate-methyl methacrylate copolymer, and cellulose acetate butyrate, although the invention is not limited to these resins.

Also, various monomers, prepolymers, crosslinking agents, etc., which are soluble in the solvent dissolving the compound semiconductor and form film-forming resins during coating or by a post treatment (e.g., heating, light irradiation, chemical reaction, etc.) after coating can be used as a resin precursor in this invention.

A resin precursor which is preferably used in this invention is a composition containing a crosslinking agent and capable of forming a netting structure during coating or by a post treatment after coating.

As the resin precursors for use in this invention, various compounds described, e.g., in *Kakyozai (Crosslinking Agent) Handbook*, published by Taisei Sha, 1981, can be used.

Practical examples are the crosslinking agents illustrated above as the resins for the subbing layer.

A crosslinking agent having one or more isocyanate group(s) or one or more epoxy group(s) as the crosslinking component is particularly preferably used as the resin precursor.

An isocyanate compound having two or more isocyanate groups in one molecule and capable of forming a netting structure by itself or as a combination with an active hydrogen compound is preferably used in this invention.

As the isocyanate compounds for use in this invention, there are polyisocyanate type compounds such as triphenylmethane triisocyanate, diphenylmethane diisocyanate, tolylene diisocyanate, the dimer of 2,4-tolylene diisocyanate, naphthalene-1,5-diisocyanate, o-tolylene diisocyanate, polymethylene polyphenyl isocyanate, hexamethylene diisocyanate, etc., and polyisocyanate adduct type compounds such as the adduct of tolylene diisocyanate and trimethylolpropane, the adduct of hexamethylene diisocyanate and water, the adduct of xylylene diisocyanate and trimethylolpropane, etc., although the invention is not limited to these compounds.

Furthermore, as other isocyanate compounds than the aforesaid ones, block type isocyanates blocked by a phenol such as phenol, cresol, etc., or an alcohol, can be also used.

Also, as the active hydrogen compound which is used together with the isocyanate compound, there are compounds having a hydroxy group, a carboxy group, an amino group or an amido group. Specific examples thereof are 1,4-butanediol, ethylene glycol, glycerol, polyether type polyol, polyester type polyol, acryl type polyol, epoxy resin type polyol, 4,4-methylenebis(2-chloroaniline), and hydroxypropylated ethylenediamine, although the invention is not limited to these compounds.

The isocyanate compound is used in an amount of from 1 to 100% by weight, and preferably from 3 to 50% by weight of the compound semiconductor. If the amount thereof is less than 1% by weight, the effect of preventing the occurrence of the crystallization of the compound semiconductor is less while if the amount is larger than 100% by weight, the electric conductivity of the element of this invention is reduced.

In the case of using the isocyanate compound together with the active hydrogen compound, the ratio of the isocyanate compound to the active hydrogen compound is from 1/99 to 99/1, and preferably from 5/95 to 95/5 by weight ratio.

As an epoxy group-containing compound which is also used as the crosslinking agent for the electroconductive layer in this invention, various epoxy resins such as those described in *Kakyozai* (*Crosslinking Agent*) *Handbook*, published by Taisei Sha, 1981 can be used.

The epoxy resins for use in this invention include ordinary epoxy resins and epoxy group-containing acryl resins.

An epoxy resin is generally prepared by the reaction of a diol and epichlorohydrin. In commercially available epoxy resins, bisphenol A is frequently used as the diol.

Practical examples of the commercially available epoxy resins are Epon-812, Epon-815, Epon-820, Epon-828, Epon-834, Epon-836, Epon-1001, Epon-1002, Epon-1004, Epon-1007, Epon-1009, and Epon-1031 (trade names, made by Shell Oil Company), Araldite-252, Araldite-260, Araldite-280, Araldite-502, Araldite-6005, Araldite-6071, Araldite-6700, Araldite-6084, Araldite-6097, and Araldite-6099 (trade names, made by Ciba Geigy Corporation), Dow-331, Dow-332, Dow-661, Dow-664, and Dow-667 (Dow Chemical Company), Bakelite-2774, Bakelite-2795, Bakelite-2002, Bakelite-2053, Bakelite-2003, and Bakelite-3794 (trade names, made by Bakelite Company), Epoxide-201 (trade name, made by Union Carbide Corporation), and Epikote-828 and Epikote-1001 (trade names, made by Asahi Denka Kogyo K.K.).

As a hardening agent which is used with the epoxy resin, there are, for example, organic polyamines, boron halide complexes, ketimines, acid anhydrides, isocyanate compounds, phenol resins, etc.

The aforesaid epoxy resin or resin precursor which is used with the compound semiconductor in this invention is used in an amount of from 1 to 100% by weight, and preferably from 3 to 30% by weight of the compound semiconductor. If the amount is less than 1% by weight, the effect of preventing the occurrence of the crystallization of the compound semiconductor is less and if the amount is larger than 100% by weight, the electric conductivity of the element is reduced.

In a preferred method of forming the electroconductive layer in this invention, the solubilized compound semiconductor and the resin or resin precursor soluble in a volatile solvent are dissolved in a volatile solvent, the solution is coated on a subbing layer formed on a support to let absorb the coated solution in the subbing layer, and then the solvent is evaporated off.

The solution of the compound semiconductor may be coated by, for example, rotary coating, dip coating, spray coating, bead coating by continuous coating machine, a continuously moving wick method, or a coating method using a hopper, although the invention is not limited to the coating methods.

The invention is further explained in more detail based on the following nonlimiting examples.

EXAMPLE 1

A solution of 4 g of a vinylidene chloride resin (Saran R202, trade name, made by Asahi chemical Industry Co., Ltd.) dissolved in a mixed solvent of 696 g of dichloromethane and 300 g of cyclohexanone was coated on a polyethylene terephthalate film of 100 μm in thickness by an extrusion hopper and dried at 100° C. to form a subbing layer having a thickness of 0.4 μm. Thereafter, a solution containing 3 g of cuprous iodide and 0.2 g of a vinyl acetate resin (C-5, trade name, made by Sekisui Chemical Co., Ltd.) in 97 g of acetonitrile was coated on the subbing layer at a dry weight of 0.3 $g/m^2$ and dried at 100° C. The solution was absorbed in the subbing layer to form a layer of fine particles of cuprous iodide in the subbing layer as an upper layer portion. The surface resistance of the electroconductive layer formed, measured by Loresta MCP-TESTER (trade name, made by Mitsubishi Petrochemical Company, Ltd.) was $1.2\times10^4$ Ω/□. Also, the light transmittance of the layer was 77% at 550 nm.

For testing the environmental stability of the electroconductive element thus obtained, the element was allowed to stand for 60 days at 25° C. and 60% RH, for 20 days at 50° C. and 50% RH, or for 20 days at 50° C. and 80% RH. No change of the surface resistance and light transmittance was observed.

EXAMPLE 2

A solution of 4 g of a resin prepared by copolymerizing vinylidene chloride, methyl acrylate, and itaconic acid at 85:10:5 by weight ratio, dissolved in a mixed solvent of 696 g of dichloromethane and 300 g of cyclohexanone was coated on a polyethylene terephthalate film of 100 μm in thickness by an extrusion hopper and dried at 100° C. to form a subbing layer having a thickness of 0.4 μm. Thereafter, a solution containing 3 g of cuprous iodide and 0.2 g of a vinyl chloride-vinyl acetate resin (MPR-40, made by Nisshin Kagaku K.K.) in 97 g of acetonitrile was coated on the subbing layer at a dry weight of 0.3 $g/m^2$ and dried at 100° C. to form an electroconductive layer.

The surface resistance of the electroconductive layer was $1.5\times10^4$ Ω/□ and the light transmittance thereof was 78% at 550 nm.

When the electroconductive element thus obtained was allowed to stand for 60 days at 25° C., 60% RH, for 20 days at 50° C., 50% RH, or 20 days at 50° C., 80% RH, no change of the surface resistance and light transmittance was observed.

EXAMPLE 3

A solution of 5.0 g of polyisocyanate (Millionate MR-100, trade name, Nippon Polyurethane K.K.) and 2.0 g of polyester type polyol (Nipporan 800, trade name, made by Nippon Polyurethane K.K.) which were raw materials for a two-liquid type polyurethane resin, and further 4.0 g of polyester (Polyester Adhesive 49000, trade name, made by Du Pont de Nemours and Company) dissolved in 500 g of dichloromethane was coated on a polyethylene terephthalate film of 100 μm in thickness by an extrusion hopper and dried at 100° C. to form a subbing layer having a thickness of about 0.5 μm. The layer was hardened by allowing to stand for 2 days at 50° C. Thereafter, a solution containing 3 g of cuprous iodide and 0.3 g of an isocyanate compound (Millionate MR-100, trade name, made by Nippon Polyurethane K.K.) in 97 g of acetonitrile was coated on the subbing layer at a dry weight of 0.3 $g/m^2$ and dried at 100° C. to form an electroconductive layer. The surface resistance of the electroconductive layer was $9.0\times10^3$ Ω/□ and the light transmittance thereof was 78% at 550 nm.

When the electroconductive element thus obtained was allowed to stand under the same conditions as in Example 1, no change of the surface resistance and the light transmittance was observed.

EXAMPLE 4

By following the same procedure as in Example 1 except that the vinyl acetate resin (C-5) used with cuprous iodide in Example 1 was replaced with the resin or resin precursor shown in Table 1, various electroconductive elements were prepared. The surface resistance and the light transmittance at 550 nm of each electroconductive layer formed are shown in Table 1.

TABLE 1

| Resin and Resin Precursor and Amount thereof | Surface Resistance (Ω/□) | Light Transmittance (%) |
|---|---|---|
| Cellulose Acetate | $1.2\times10^4$ | 77 |
| Butyrate 0.2 g | | |
| Coronate L*1 0.3 g | | |
| | $1.1\times10^4$ | 77 |
| Nipporan 800*2 0.2 g | | |
| Millionate MT*3 0.3 g | | |
| | $2.1\times10^4$ | 76 |
| Acrydic A-801*4 0.2 g | | |
| Epikote 828*5 0.2 g | | |
| | $2.3\times10^4$ | 75 |
| EH-651*6 0.1 g | | |

*1Trade name, made by Nippon Polyurethane K.K.
*2Trade name, made by Nippon Polyurethane K.K.
*3Trade name, made by Nippon Polyurethane K.K.
*4Trade name, made by Dainippon Ink & Chemicals, Inc.
*5Trade name, made by Asahi Denka Kogyo K.K.
*6Trade name, made by Asahi Denka Kogyo K.K.

As is shown in the above table, each element showed good electric conductivity and transparency.

When the electroconductive elements thus obtained were allowed to stand under the same conditions as in Example 1, no change of the surface resistance and light transmittance was observed in each case.

COMPARATIVE EXAMPLE 1

A subbing layer of a vinylidene chloride resin (Saran R202) having a thickness of 0.4 μm was formed on a polyethylene terephthalate film of 100 μm in thickness by the same manner as in Example 1. Thereafter, a solution containing 3 g of cuprous iodide in 97 g of acetonitrile was coated on the subbing layer at a dry weight of 0.3 $g/m^2$ and dried at 100° C. to form an electroconductive layer. The surface resistance of the electroconductive layer was $8.7\times10^3$ Ω/□ and the light transmittance thereof was 78% at 550 nm. The environmental stability of the electroconductive element thus obtained is shown in Table 2.

In the sample, cuprous iodide was crystallized to form white turbidity on the surface of the layer and a reduction in electric conductivity was observed.

TABLE 2

| Conditions | Surface Resistance (Ω/□) | Light Transmittance (%) |
|---|---|---|
| 25° C., 60% RH, 60 Days | $1.0\times10^4$ | 77 |
| 50° C., 50% RH, 20 Days | $2.4\times10^4$ | 75 |
| 50° C., 80% RH, 20 Days | $8.2\times10^6$ | 62 |

As is shown in the above table, it was observed that the surface resistance increased with the reduction in light transmittance at 550 nm.

COMPARATIVE EXAMPLE 2

A subbing layer of a resin prepared by copolymerizing vinylidene chloride, methyl acrylate, and itaconic acid at 85:10:5 by weight ratio having a thickness of 0.4 μm was formed on a polyethylene terephthalate film of 100 μm in thickness by the same manner as in Example 2. Thereafter, a solution containing 3 g of cuprous iodide in 97 g of acetonitrile was coated on the subbing layer at a dry weight of 0.3 $g/m^2$ and dried at 100° C. to form an electroconductive layer. The surface resistance of the layer was $7.8\times10^3$ Ω/□ and the light transmittance thereof was 78% at 550 nm. The environmental stability of the electroconductive element thus obtained is shown in Table 3 below.

TABLE 3

| Conditions | Surface Resistance (Ω/□) | Light Transmittance (%) |
|---|---|---|
| 25° C., 60% RH, 60 Days | $9.0\times10^3$ | 77 |
| 50° C., 50% RH, 20 Days | $2.0\times10^4$ | 73 |
| 50° C., 80% RH, 20 Days | ∞ | 48 |

In the sample, cuprous iodide was crystallized to cause white turbidity on the surface of the layer and reduction of the electric conductivity was observed.

COMPARATIVE EXAMPLE 3

A subbing layer of a hardened two-liquid type polyurethane resin having a thickness of 0.5 μm was formed on a polyethylene terephthalate film of 100 μm in thickness by the same manner as in Example 3. Thereafter, a solution containing 3 g of cuprous iodide in 97 g of acetonitrile was coated thereon at a dry weight of 0.3 $g/m^2$ and dried at 100° C. The surface resistance of the electroconductive layer thus-obtained was $1.0\times10^4$ Ω/□ and the light transmittance thereof at 550 nm was 77%.

The environmental stability of the electroconductive element is shown in Table 4 below.

TABLE 4

| Conditions | Surface Resistance (Ω/□) | Light Transmittance (%) |
|---|---|---|
| 25° C., 60% RH, 60 Days | $1.8\times10^3$ | 75 |
| 50° C., 50% RH, 20 Days | $4.8\times10^4$ | 72 |
| 50° C., 80% RH, 20 Days | ∞ | 52 |

In the sample, the surface of the layer became white turbid and reduction of the electric conductivity was observed.

EXAMPLE 5

A subbing layer of a Saran R202 resin having a thickness of 0.4 μm was formed on a polyethylene terephthalate film of 100 μm in thickness by the same manner as in Example 1. Then, a solution of 7.76 g of silver iodide, 2.14 g of potassium iodide, and 0.8 g of a vinyl chloride-vinyl acetate resin (MPR-40, trade name, made by Nisshin Kagaku K.K.) dissolved in 490 g of a mixed solvent of acetone and cyclohexanone of 1:1 by weight ratio was coated thereon at a dry weight of 0.6 $g/m^2$ and dried at 100° C. The surface resistance of the electroconductive layer thus formed was $2.8\times10^6$ Ω/□.

When the electroconductive element was allowed to stand under the conditions as in Example 1, no change of the surface resistance and light transmittance was observed.

EXAMPLE 6

For comparing the organic solvent resistance and the adhesive property with an upper layer, the coating composition shown below was coated with each of (1) the electroconductive element formed in Example 2 and (2) the electroconductive element formed in Comparative Example 2 at a dry weight of 10 $g/m^2$ and dried at 100° C. to form an upper layer.

The organic solvent resistance of each of Samples (1) and (2) obtained was evaluated by the presence of creases by observing the layer using a microscope at a magnification of 100. Also, the adhesive property was tested as follows. The surface of the layer was scratched into 100 squares of 2 mm×2 mm by a cutter knife. Then, a peeling test was performed using an adhesive tape (Mylar Tape, trade name, made by Nitto Electric Industrial Co., Ltd.), and the peeled percentage was determined by the number of peeled squares. The results obtained are shown in Table 5 below.

| Coating Composition: | |
|---|---|
| Polycarbonate Resin | 8 g |
| Vinylidene Chloride Resin (Saran R202) | 2 g |
| Methylene Chloride | 30 g |
| Cyclohexanone | 30 g |
| Methyl Ethyl Ketone | 30 g |

TABLE 5

| Sample | Organic Solvent Resistance (microscopic observation) | Adhesive Property (peeling percentage) (%) |
|---|---|---|
| (1) | Fine creases locally occurred in the subbing layer | 55 |
| (2) | Fine creases occurred in the entire surface of the subbing layer | 98 |

From the results of Examples 1 to 5 and Comparative Examples 1 to 3, it can be seen that in the electroconductive elements of this invention, the crystallization of compound semiconductors is restrained and these elements show good electric conductivity and transparency for a long period of time.

Also, from the results of Example 6, it can be seen that the electroconductive element of this invention is excellent in organic solvent resistance and adhesive property as compared with the electroconductive element of Comparative Example 1.

EXAMPLE 7

A solution of 4 g of a vinylidene chloride resin (Saran R202, trade name, made by Asahi Chemical Industry Co., Ltd.) dissolved in a mixed solvent of 696 g of dichloromethane and 300 g of cyclohexanone was coated on a polyethylene terephthalate of 100 μm in thickness by an extrusion hopper and dried at 100° C. to form a subbing layer having a thickness of 0.4 μm. Thereafter, a solution containing 3 g of cuprous iodide and 0.3 g of an isocyanate compound (Coronate L, trade name, made by Nippon Polyurethane K.K.) in 97 g of acetonitrile was coated thereon at a dry weight of 0.3 $g/m^2$ and dried at 100° C. The solution was adsorbed in the subbing layer to form a layer of fine particles of cuprous iodide in the subbing layer as an upper layer portion. The surface resistance of the electroconductive layer formed, measured by Loresta MCP-TESTER (trade name, made by Mitsubishi Petrochemical Company), was $9.3\times10^3$ Ω/□. Also, the light transmittance thereof at 550 nm was 78%.

For determining the environmental stability of the electroconductive element, the element was allowed to stand for 60 days at 25° C., 60% RH, for 20 days at 50° C., 50% RH, or 20 days at 50° C., 80% RH. No change of the surface resistance and light transmittance was observed.

EXAMPLE 8

A solution of 4 g of a resin prepared by copolymerizing vinylidene chloride, methyl acrylate, and itaconic acid at 85:10:5 by weight ratio, dissolved in a mixed solvent of 696 g of dichloromethane and 300 g of cyclohexanone was coated on a polyethylene terephthalate film of 100 μm in thickness by an extrusion hopper and dried at 100° C. to form a subbing layer having a thickness of 0.4 μm. Thereafter, a solution containing 3 g of cuprous iodide and 0.3 g of an isocyanate compound (Millionate MR-100, trade name, made by Nippon Polyurethane K.K.) in 97 g of acetonitrile was coated thereon at a dry weight of 0.3 $g/m^2$ and dried at 100° C. The surface resistance of the electroconductive layer formed was $8.1\times10^3$ Ω/□ and the light transmittance at 550 nm was 78%.

When the electroconductive element was allowed to stand under the same conditions as in Example 7, no change of the surface resistance and light transmittance was observed.

EXAMPLE 9

A solution of 5.0 g of polyisocyanate (Millionate MR-100, trade name, made by Nippon Polyurethane K.K.), 2.0 g of polyester type polyol (Nipporan 800, trade name, made by Nippon Polyurethane K.K.), and 4.0 g of polyester (Polyester Adhesive 49000, trade name, made by Du Pont de Nemours Company) dissolved in 500 g of dichloromethane was coated on a polyethylene terephthalate film of 100 μm in thickness by an extrusion hopper and dried at 100° C. to form an electroconductive layer having a thickness of about 0.5 μm. The layer was hardened by allowing to stand for 2 days at 50° C. Thereafter, a solution containing 3 g of cuprous iodide, 0.3 g of an isocyanate compound (Millionate MR-100, trade name, made by Nippon Polyurethane K.K.), and 0.2 g of polyester type polyol (Nipporan 121, trade name, made by Nippon Polyurethane K.K.) in 97 g of acetonitrile was coated thereon at a dry weight of 0.3 $g/m^2$ and dried at 100° C. The surface resistance of the electroconductive layer formed was $1.2\times10^4$ Ω/□ and the light transmittance thereof at 550 nm was 77%.

When the electroconductive element was allowed to stand under the same conditions as in Example 7, no change of the surface resistance and the light transmittance was observed.

EXAMPLE 10

The same procedure as in Example 7 was followed except that the isocyanate compound (Coronate L) used with cuprous iodide in Example 7 was replaced with each of the isocyanate compounds (if necessary, an active hydrogen compound was added) shown in Table 6 below. The surface resistance of each of the electroconductive layers thus formed is shown in Table 6 together with the light transmittance thereof at 550 nm.

TABLE 6

| Isocyanate Compound and Amount | Active Hydrogen Compound and Amount | Surface Resistance (Ω/□) | Light Transmittance (%) |
|---|---|---|---|
| Millionate MT*1 0.4 g | None | $8.6 \times 10^3$ | 78 |
| Burnock D-750*2 0.5 g | None | $9.1 \times 10^3$ | 77 |
| Takenate D110N*3 0.5 g | None | $9.3 \times 10^3$ | 77 |
| Millionate MR-100*4 0.4 g | None | $7.9 \times 10^3$ | 78 |
| Millionate MR-100*4 0.4 g | Nipporan 800*5 0.2 g | $1.1 \times 10^4$ | 76 |
| Millionate MR-100*4 0.4 g | Acrydic A-801*6 0.2 g | $2.1 \times 10^4$ | 76 |

*1 *Trade name, made by Nippon Polyurethane K.K.*
*2 *Trade name, made by Dainippon Ink and Chemicals, Inc.*
*3 *Trade name, made by Takeda Chemical Industries, Ltd.*
*4 *Trade name, made by Nippon Polyurethane K.K.*
*5 *Trade name, made by Nippon Polyurethane K.K.*
*6 *Trade name, made by Dainippon Ink and Chemicals, Inc.*

As is shown in Table 6, each element showed good electric conductivity and transparency.

When the electroconductive elements thus obtained were allowed to stand under the same conditions as in Example 7, no change of the surface resistance and the light transmittance was observed.

EXAMPLE 11

A subbing layer of a Saran R202 resin having 1. a thickness of 0.4 μm was formed on a polyethylene terephthalate film of 100 μm in thickness by the same manner as in Example 7. Then, a solution of 7.76 g of silver iodide, 2.14 g of potassium iodide, and 0.8 g of an isocyanate compound (Coronate L) dissolved in 490 g of a mixed solvent of acetone and cyclohexanone of 1:1 by weight ratio was coated thereon at a dry weight of 0.6 g/m$^2$ and dried at 100° C. The surface resistance of the electroconductive layer formed was $2.8 \times 10^6$ Ω/□.

When the electroconductive element thus obtained was allowed to stand under the same conditions in Example 7, no change of the surface resistance was observed.

EXAMPLE 12

For comparing the organic solvent resistance and the adhesive property with an upper layer, the following coating composition was coated on (1) the electroconductive element formed as in Example 7, (2) the electroconductive element formed as in Example 7 and allowed to stand for 2 days at 50° C., 80% RH to sufficiently proceed the crosslinking reaction by the isocyanate, or (3) the electroconductive element formed as in Comparative Example 1, at a dry weight of 10 g/m$^2$ and dried at 100° C. to form an upper layer.

The organic solvent resistance of Samples (1), (2) and (3) obtained was evaluated by the presence of creases by observing the layer using a microscope of a magnification of 100. Also, the adhesive property was tested as follows. The surface of each layer was scratched to form 100 squares of 2 mm×2 mm by a cutter knife. Then, a peeling test was performed using an adhesive tape (Mylar Tape, made by Nitto Electric Industrial Co.), and the peeling percentage was determined by the number of peeled squares. The results are shown in Table 7 below.

| Coating Composition: | |
|---|---|
| Polycarbonate Resin | 8 g |
| Vinylidene Chloride Resin (Saran R202) | 2 g |
| Methylene Chloride | 30 g |
| Cyclohexanone | 30 g |
| Methyl Ethyl Ketone | 30 g |

TABLE 7

| Sample | Organic Solvent Resistance (microscopic observation) | Adhesive Property (peeling percentage) (%) |
|---|---|---|
| (1) | Fine creases locally occurred in the subbing layer | 41 |
| (2) | Good surface state (no creases occurred) | 39 |
| (3) | Fine creases occurred in the entire subbing layer | 98 |

From the results of Examples 7 to 11, it can be seen that each of the electroconductive elements composed of a combination of the compound semiconductor and the isocyanate compound or a combination of the compound semiconductor, the isocyanate compound, and the active hydrogen compound shows a restrained crystallization of the compound semiconductor and good electric conductivity and transparency for a long period of time as compared to the electroconductive element of Comparative Examples 1 to 3.

Also, from the results of Example 12, it can be seen that the electroconductive element of this invention is excellent in organic solvent resistance and adhesive property as compared with the electroconductive element of Comparative Example 1 and the organic solvent resistance of the element is further improved by sufficiently proceeding the crosslinking reaction by the isocyanate component in the electroconductive layer.

EXAMPLE 13

A solution of 4 g of a resin prepared by copolymerizing vinylidene chloride, methyl acrylate, and itaconic acid at 84:11:5 by mol ratio, dissolved in a mixed solvent of 700 g of dichloromethane and 300 g of cyclohexanone, was coated on a polyethylene terephthalate film of 100 μm in thickness by an extrusion hopper and dried at 100° C. to form a subbing layer having a thickness of 0.4 μm. Thereafter, a solution containing 3 g of cuprous iodide in 97 g of acetonitrile was coated on the layer at a dry weight of 0.3 g/m$^2$ and dried at 100° C. The solution was absorbed in the subbing layer to form a layer of the fine particles of cuprous iodide in the subbing layer as an upper layer portion. The surface resistance of the electroconductive layer, measured by Loresta MCP- TESTER (trade name, made by Mitsubishi Petrochemical Company, Ltd.) was $7.8\times10^3$ Ω/□. Also, the light transmittance at 550 nm was 78%.

EXAMPLES 14 TO 27

By following the same procedure as in Example 13 except that the resin of vinylidene chloride/methyl acrylate/itaconic acid copolymer (84:11:5 by mol ratio) as the binder for the subbing layer in Example 13 was replaced with each of the resins shown in Table 8, electroconductive elements were prepared. The surface resistance and the light transmittance at 550 nm of each electroconductive element are shown in Table 8.

TABLE 8

| Sample No. | Resin | Surface Resistance (Ω/□) | Light Transmittance (%) |
|---|---|---|---|
| 14 | Vinylidene Chloride/Methyl Acrylate: 84/16 by mol ratio | $5.8\times10^4$ | 78 |
| 15 | Vinylidene Chloride/Acrylonitrile: 75/25 by mol ratio | $1.2\times10^4$ | 77 |
| 16 | Vinylidene Chloride/Acrylic Acid: 84/16 by mol ratio | $5.0\times10^4$ | 78 |
| 17 | Vinylidene Chloride/Methyl Acrylate/Acrylic Acid: 84/11/5 by mol ratio | $1.3\times10^4$ | 78 |
| 18 | Vinylidene Chloride/Acrylonitrile/Acrylic Acid: 75/21/4 by mol ratio | $6.2\times10^3$ | 78 |
| 19 | Vinylidene Chloride/Methyl Acrylate/Maleic Acid: 84/11/5 by mol ratio | $3.3\times10^4$ | 78 |
| 20 | Vinylidene Chloride/Acrylonitrile/Itaconic Acid: 75/21/4 by mol ratio | $8.8\times10^3$ | 79 |
| 21 | Vinylidene Chloride/Methyl Methacrylate/Itaconic Acid: 75/23/2 by mol ratio | $7.2\times10^4$ | 77 |
| 22 | Vinylidene Chloride/Acrylonitrile/Itaconic Acid: 70/25/5 by mol ratio | $6.8\times10^4$ | 78 |
| 23 | Vinylidene Chloride/Diethyl Itaconate/Itaconic Acid: 82/13/5 by mol ratio | $1.6\times10^4$ | 78 |
| 24 | Vinylidene Chloride/Diethyl Maleate/Maleic Acid: 82/13/5 by mol ratio | $7.2\times10^4$ | 78 |
| 25 | Vinylidene Chloride/Methyl Acrylate/Methyl Methacrylate/Acrylic Acid: 80/8/7/6 by mol ratio | $1.6\times10^4$ | 77 |
| 26 | Vinylidene Chloride/Acrylonitrile/Acrylic Acid/Itaconic Acid: 75/20/5/5 by mol ratio | $2.2\times10^4$ | 78 |
| 27 | Vinylidene Chloride/Methyl Acrylate/Acrylic Acid/Maleic Acid: 80/10/5/5 by mol ratio | $1.8\times10^4$ | 79 |

COMPARATIVE EXAMPLES 4 TO 6

By following the same procedure as in Example 13 except that the resin of vinylidene chloride/methyl acrylate/itaconic acid (84:11:5 by mol ratio) used as the binder for the subbing layer in Example 13 was replaced with each of the resins shown in Table 9, electroconductive elements were prepared. The surface resistance and the light transmittance at 550 nm of each of the electroconductive elements are shown in Table 9.

TABLE 9

| Comparative Sample No. | Resin | Surface Resistance (Ω/□) | Light Transmittance (%) |
|---|---|---|---|
| 4 | Vinylidene Chloride/Acrylonitrile: 92/8 by mol ratio | $9.0\times10^3$ | 77 |
| 5 | Vinylidene Chloride/Methyl Acrylate/Itaconic Acid: 50/30/20 by mol ratio | $5.2\times10^7$ | 77 |
| 6 | Vinylidene Chloride/Acrylonitrile/Acrylic Acid: 65/25/10 by mol ratio | $4.0\times10^7$ | 78 |

Evaluation 1

For comparing the light fastness, the electroconductive elements prepared in Example 13, 15 and 18 and Comparative Example 4 were irradiated by a halogen lamp at 150,000 lux for 4 hours. Thereafter, each of the samples was allowed to stand for 7 days at 50° C., 80% RH and then the surface resistance was measured.

The results obtained are shown in Table 10.

TABLE 10

| Sample | Surface Resistance before Exposure (Ω/□) | Surface Resistance after Allowing to Stand for 7 Days after Exposure |
|---|---|---|
| Electroconductive Element in Example 13 | $7.8\times10^3$ | $9.2\times10^4$ |
| Electroconductive Element in Example 15 | $1.2\times10^4$ | $2.6\times10^4$ |
| Electroconductive Element in Example 18 | $6.2\times10^3$ | $9.0\times10^3$ |
| Electroconductive Element in Comparative Example 4 | $9\times10^3$ | ∞ |

Evaluation 2

For comparing the organic solvent resistance, the following coating composition was coated on each of the electroconductive elements prepared in Examples 13 and 17 and Comparative Example 5 at a dry weight of 10 g/m$^2$ and dried at 100° C. to form each upper layer. The solvent resistance of the element was evaluated by the presence of creases in the subbing layer by observing the layer using a microscope of a magnification of 100. The results obtained are shown in Table 11.

TABLE 11

| Sample | Organic Solvent Resistance (microscopic observation) |
|---|---|
| Electroconductive Element Prepared in Example 13 | Good Coated Surface State (no creases occurred) |
| Electroconductive Element Prepared in Example 17 | Good Coated Surface State (no creases occurred) |
| Electroconductive Element Prepared in Comparative Example 5 | Fine Creases Occurred in the Entire Subbing Layer |

From the results of Examples 13 to 27, it can be seen that the electroconductive elements having the subbing layer using the vinylidene chloride resin in this invention have good electric conductivity i.e., lower than $10^5$ Ω/□ in surface resistance, as compared with the electroconductive elements of Comparative Examples 5 and 6.

Also, by Evaluation 1 and Evaluation 2 described above, it can be seen that the electroconductive elements of this invention show good light fastness and organic solvent resistance.

As described above, in the electroconductive elements of this invention, the crystallization of the compound semiconductor contained therein is restrained and the transparency and electric conductivity thereof are stable for a long period of time. In addition, the elements have good organic solvent resistance and adhesive property with an upper layer when used in a multilayer structure, such as for electrophotography, etc.

Also, when the electroconductive layer is formed by coating a solution containing an isocyanate compound in this invention, the organic solvent resistance is further improved by sufficiently proceeding the crosslinking reaction by the isocyanate compound.

Furthermore, the electroconductive element of this invention having the subbing layer containing the vinylidene chloride resin shown by formula (I) described above has good transparency, electric conductivity, light fastness, and organic solvent resistance and the characteristics are sufficiently kept even in the case that the electroconductive layer is formed by coating a solution of the compound semiconductor without containing the resin or the resin precursor.

The transparent electroconductive elements of this invention can be used as base materials for electrophotographic recording, base materials of electrostatic recording, transparent electrodes for thin layer type liquid crystal display, transparent electrodes for dispersion type EL, transparent electrodes for touch panel, antistatic films or layers for clean rooms, windows of meters, VTR tapes, etc., transparent heaters, etc.

While the invention has been described in detail and with reference to specific embodiments thereof, it will be apparent to one skilled in the art that various changes and modifications can be made therein without departing from the spirit and scope thereof.

What is claimed is:

1. An electroconductive element comprising a support, a subbing layer, and an electroconductive layer, where in said electroconductive element is transparent, wherein the electroconductive layer is formed by coating, on the subbing layer, a solution comprising:
(A) a compound semiconductor,
(B) a solvent dissolving the compound semiconductor, wherein said subbing layer is swelled by said solvent and
(C) a resin or a resin precursor soluble in the solvent selected from the group consisting of epoxy resins and isocyanate compounds.

2. The electroconductive element as claimed in claim 1, wherein said resin or resin precursor is an epoxy resin.

3. The electroconductive element as claimed in claim 1, wherein said resin or resin precursor is an isocyanate compound.

4. The electroconductive element as claimed in claim 1, wherein said resin or resin precursor is a composition composed of an isocyanate compound and an active hydrogen compound.

5. The electroconductive element as claimed in claim 1, wherein said subbing layer has a thickness of 0.01 to 100 $\mu$m.

6. The electroconductive elements as claimed in claim 5, wherein said subbing layer has a thickness of 0.05 to 10 $\mu$m.

7. The electroconductive element as claimed in claim 1, wherein said solution is coated at a dry weight of from 40 to 2,000 mg/m$^2$.

8. The electroconductive element as claimed in claim 7, wherein said solution is coated at a dry weight of from 100 to 1,000 mg/m$^2$.

9. The electroconductive element as claimed in claim 3, wherein said isocyanate compound is employed in an amount of from 1 to 100% by weight of the compound semiconductor.

10. The electroconductive element as claimed in claim 9, wherein said isocyanate compound is employed in an amount of from 3 to 50% by weight of the compound semiconductor.

11. The electroconductive element as claimed in claim 2, wherein said epoxy resin is employed in an amount of from 1 to 100% by weight of the compound semiconductor.

12. The electroconductive element as claimed in claim 11, wherein said epoxy resin is employed in an amount of from 3 to 30% by weight of the compound semiconductor.

13. An electroconductive element comprising a support, a subbing layer, and an electroconductive layer, wherein said electroconductive element is transparent, wherein the subbing layer, comprising a vinylidene chloride resin represented by the following formula (I), is formed on the support and the electroconductive layer, comprising a compound semiconductor is formed on the subbing layer by coating the subbing layer with a solution comprising:
(A) the compound semiconductor:
(B) a solvent dissolving the compound semiconductor, wherein said subbing layer is swelled by said solvent and
(C) a resin or a resin precursor soluble in the solvent selected from the group consisting of epoxy resins and isocyanate compounds:

wherein A represents at least one structure unit selected from the group consisting of

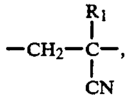 , 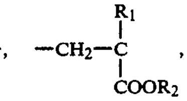 ,

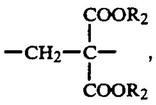 , and 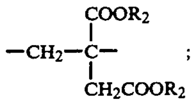 ;

B represents at least one structure unit selected from the group consisting of

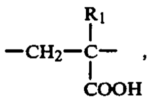 , 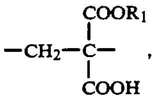 , and 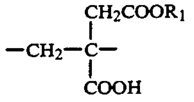

wherein $R_1$ represents a hydrogen atom, a methyl group, an ethyl group, or a propyl group; $R_2$ represents a methyl group, an ethyl group, or a propyl group; and x, y and z each represents mol %, x is in the range of from 65 to 90 mol %, y is in the range of from 0 to 35 mol %, z is in the range of from 0 to 35 mol %, and x+y+z=100.

14. The electroconductive element as claimed in claim 13, wherein A is a structure unit derived from acrylonitrile, α-alkylacrylonitrile, alkyl acrylate, alkyl α-alkylacrylate, dialkyl maleate, or dialkyl itaconate, and B is a structure unit derived from acrylic acid, α-alkylacrylic acid, maleic acid, monoalkyl maleate, itaconic acid, or monoalkyl itaconate.

15. The electroconductive element as claimed in claim 13, wherein the content of A in said vinylidene chloride resin is from 0 to 35 mol %.

16. The electroconductive element as claimed in claim 15, wherein the content of A in said vinylidene chloride resin is from 10 to 30 mol %.

17. The electroconductive element as claimed in claim 13, wherein the content of B in said vinylidene chloride resin is from 0 to 35 mol %.

18. The electroconductive element as claimed in claim 17, wherein the content of B in said vinylidene chloride resin is from 1 to 25 mol %.

19. The electroconductive element as claimed in claim 13, wherein x is from 70 to 85 mol %, y is from 10 to 30 mol % and z is from 1 to 25 mol %.

20. The electroconductive element as claimed in claim 13, wherein said vinylidene chloride is selected from the group consisting of a vinylidene chloride/-methyl acrylate copolymer, a vinylidene chloride/-methyl methacrylate copolymer, a vinylidene chloride/acrylonitrile copolymer, a vinylidene chloride/-diethyl maleate copolymer, a vinylidene chloride/-diethyl itaconate copolymer, a vinylidene chloride/-methyl acrylate/acrylic acid copolymer, a vinylidene chloride/methyl methacrylate/acrylic acid copolymer, a vinylidene chloride/acrylonitrile/acrylic acid copolymer, a vinylidene chloride/methyl acrylate/maleic acid copolymer, a vinylidene chloride/methyl methacrylate/maleic acid copolymer, a vinylidene chloride/acrylonitrile/maleic acid copolymer, a vinylidene chloride/methyl acrylate/itaconic acid copolymer, a vinylidene chloride/methyl methacrylate/itaconic acid copolymer, a vinylidene chloride/acrylonitrile/itaconic acid copolymer, a vinylidene chloride/methyl acrylate/methyl methacrylate/acrylic acid copolymer, a vinylidene chloride/methyl acrylate/methyl methacrylate/itaconic acid copolymer, and a vinylidene chloride/methyl methacrylate/acrylonitrile/acrylic acid copolymer.

* * * * *